(12) United States Patent
Cheng et al.

(10) Patent No.: US 9,025,098 B2
(45) Date of Patent: May 5, 2015

(54) PIXEL STRUCTURE HAVING METAL-INSULATOR-SEMICONDUCTOR CAPACITOR

(71) Applicant: Au Optronics Corporation, Hsinchu (TW)

(72) Inventors: Hsiao-Wei Cheng, Hsinchu County (TW); Sung-Hui Lin, New Taipei (TW); Ming-Yung Huang, Changhua County (TW); Pin-Miao Liu, Hsinchu County (TW); Wen-Shin Wu, Pingtung County (TW); Chun-Yao Huang, Hsinchu (TW); Wei-Sheng Yu, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 14/320,657

(22) Filed: Jul. 1, 2014

(65) Prior Publication Data

US 2014/0313466 A1    Oct. 23, 2014

Related U.S. Application Data

(62) Division of application No. 13/025,178, filed on Feb. 11, 2011, now Pat. No. 8,804,059.

(30) Foreign Application Priority Data

Oct. 18, 2010    (TW) ................................. 99135459 A

(51) Int. Cl.
*G02F 1/1343*    (2006.01)
*G02F 1/1362*    (2006.01)

(52) U.S. Cl.
CPC ................................ *G02F 1/136213* (2013.01)

(58) Field of Classification Search
CPC ................................................. G02F 1/136213
USPC ................................................ 349/38, 39, 140
See application file for complete search history.

(56) References Cited

U.S. PATENT DOCUMENTS 5,943,105 A * 8/1999 Fujikawa et al. ................ 349/39
2008/0129907 A1 * 6/2008 Jun et al. ......................... 349/38

* cited by examiner

*Primary Examiner* — Paisley L Arendt
(74) *Attorney, Agent, or Firm* — Jianq Chyun IP Office

(57) ABSTRACT

A pixel structure including a scan line, a data line, an active device, a pixel electrode, a capacitor electrode line, a semi-conductive pattern layer and at least one dielectric layer is provided. The active device is electrically connected to the scan line and the data line. The pixel electrode is electrically connected to the active device. The capacitor electrode line is located under the pixel electrode. A first storage capacitor is formed between the capacitor electrode line and the pixel electrode. The semi-conductive pattern layer is disposed between the capacitor electrode line and the pixel electrode, the pixel electrode is electrically connected to the semi-conductive pattern layer. A second storage capacitor is formed between the semi-conductive pattern layer and the capacitor electrode line. The dielectric layer is disposed between the capacitor electrode line and the pixel electrode and located between the semi-conductive pattern layer and the capacitor electrode line.

3 Claims, 9 Drawing Sheets

PIXEL STRUCTURE HAVING METAL-INSULATOR-SEMICONDUCTOR CAPACITOR

CROSS-REFERENCE TO RELATED APPLICATION

This application is a divisional application of U.S. application Ser. No. 13/025,178, filed on Feb. 11, 2011, now allowed, which claims the priority benefit of Taiwan application serial no. 99135459, filed on Oct. 18, 2010. The entirety of each of the above-mentioned patent applications is hereby incorporated by reference herein and made a part of this specification.

BACKGROUND OF THE INVENTION

1. Field of the Invention

The invention relates to a pixel structure and more particularly to a pixel structure of a flat display.

2. Description of Related Art

An image sticking phenomenon of a flat display means an image or a contour of a previous static frame remains in a subsequent frame. That is, when a flat display displays a static frame persistently for a long period of time, an image or a contour from a previous static frame remains when a next frame is displayed.

Currently, in flat displays, liquid crystal displays are performed with an image sticking test before launching, for example. Conventionally, the image sticking test includes displaying a checkered black and white pattern on a display panel for a long period of time and then switching to a full screen with grayscale. If a sticking image of the checkered black and white pattern is shown on the full screen with the average grayscale, the image sticking phenomenon of the flat display is more serious. In contrast, if the sticking image of the checkered black and white pattern is not shown on the full screen with the average grayscale, then the flat display has minimal or no image sticking at all.

As for the flat displays with the image sticking phenomenon, if the image sticking phenomenon can be compensated or reduced with other methods, the yield rate and the display quality of the flat displays can be enhanced.

SUMMARY OF THE INVENTION

The invention is directed to a pixel structure capable of compensating a brightness difference caused by an image sticking phenomenon of a flat display (especially of a flat display with a normally black driving method) so as to reduce surface type image sticking of a flat display.

The invention is directed to a pixel structure including a scan line, a data line, an active device, a pixel electrode, a capacitor electrode line, a semi-conductive pattern layer, and at least one dielectric layer. The active device is electrically connected to the scan line and the data line. The pixel electrode is electrically connected to the active device. The capacitor electrode line is located underneath the pixel electrode. The capacitor electrode line and the pixel electrode constitute a first storage capacitor having a first storage capacitance. The semi-conductive pattern layer is disposed between the capacitor electrode line and the pixel electrode. The pixel electrode is electrically connected to the semi-conductive pattern layer. The semi-conductive pattern layer and the capacitor electrode line constitute a second storage capacitor having a second storage capacitance. The at least one dielectric layer is disposed between the capacitor electrode line and the pixel electrode and located between the semi-conductive pattern layer and the capacitor electrode line. Especially, a sum of the first storage capacitance and the second storage capacitance is a total storage capacitance, and the second storage capacitance occupies 30%-80% of the total storage capacitance.

The invention is further directed to a pixel structure including a scan line, a data line, an active device, a pixel electrode, a capacitor electrode line, a semi-conductive pattern layer, a reference electrode pattern layer, at least one dielectric layer, and a reference electrode line. The active device is electrically connected to the scan line and the data line. The pixel electrode is electrically connected to the active device. The capacitor electrode line is located underneath the pixel electrode. The capacitor electrode line and the pixel electrode constitute a first storage capacitor having a first storage capacitance. The semi-conductive pattern layer is disposed between the capacitor electrode line and the pixel electrode. The pixel electrode is electrically insulated with the semi-conductive pattern layer. The semi-conductive pattern layer and the capacitor electrode line constitute a second storage capacitor having a second storage capacitance. The reference electrode pattern layer is disposed between the pixel electrode and the semi-conductive pattern layer. The reference electrode pattern layer is electrically insulated with the pixel electrode and constitutes a third storage capacitor having a third storage capacitance with the pixel electrode. The at least one dielectric layer is disposed between the capacitor electrode line and the pixel electrode, disposed between the semi-conductive pattern layer and the capacitor electrode line, and disposed between the reference electrode pattern layer and the pixel electrode. The reference electrode line is electrically connected to the reference electrode pattern layer. A sum of the first storage capacitance, the second storage capacitance, and the third storage capacitance is a total storage capacitance. The second storage capacitance occupies 30%-80% of the total storage capacitance.

In light of the foregoing, in the invention, the semi-conductive pattern layer is disposed in the pixel structure, so that the semi-conductive pattern layer and the capacitor electrode line constitute the storage capacitor. The semi-conductive material changes the storage capacitance of the storage capacitor under different operation frequencies and different operation voltages. Thus, in the pixel structure, the storage capacitance of the storage capacitor having the semi-conductive pattern layer occupies a certain ratio of the total storage capacitance so as to compensate the brightness difference caused by the image sticking phenomenon of the flat display, thereby reducing the surface type image sticking of the flat display.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1A:
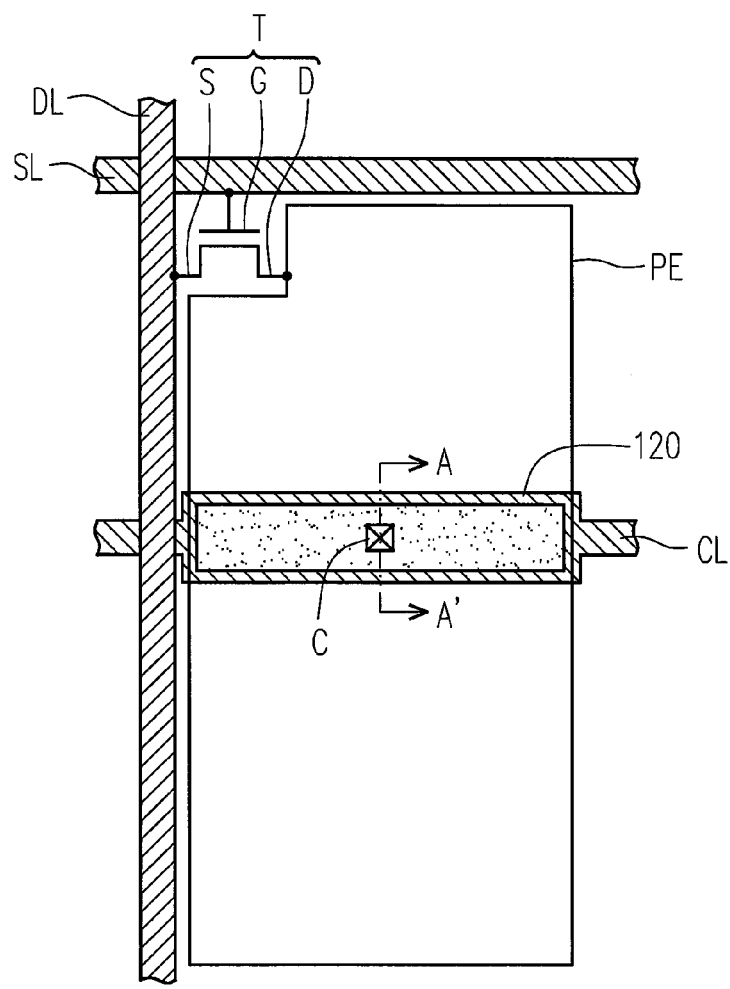
FIG. 1A illustrates a schematic top view of a pixel structure according to an embodiment of the invention.
Figure 1B:
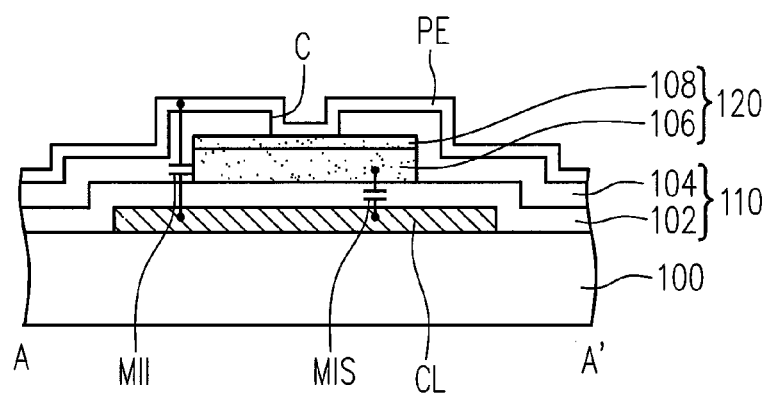
FIG. 1B shows a schematic cross-sectional view taken along line A-A' in FIG. 1A.

FIG. 1A illustrates a schematic top view of a pixel structure according to an embodiment of the invention. FIG. 1B shows a schematic cross-sectional view taken along line A-A' in FIG. 1A. Referring to FIGS. 1A and 1B, a pixel structure of the present embodiment includes a scan line SL, a data line DL, an active device T, a pixel electrode PE, a capacitor electrode line CL, a semi-conductive pattern layer 120, and at least one dielectric layer 110.

The scan line SL and the data line DL are disposed on a substrate 100. The scan line SL and the data line DL are disposed alternately. An insulation layer 102 is sandwiched between the scan line SL and the data line DL. In other words, an extension direction of the data line DL is not parallel to an extension direction of the scan line SL. Preferably, the extension direction of the data line DL is parallel to the extension direction of the scan line SL. The scan line SL and the data line SL are generally fabricated using a metal material for conductivity. However, the invention is not limited thereto. According to other embodiments, the scan line SL and the data line DL can also be fabricated using other conductive material such as an alloy, a nitride of a metal material, an oxide of a metal material, an oxynitride of a metal material or other suitable material, or a stacked layer of a metal material and other conductive material.

The active device T is electrically connected to the scan line SL and the data line DL. In details, the active device T has a gate G, a source S, and a drain D. The gate G is electrically connected to the scan line SL and the source S is electrically connected to the data line DL. The active device T is a bottom gate thin film transistor (TFT) or a top gate TFT.

The pixel electrode PE is electrically connected to the active device T. In general, the drain D of the active device T is electrically connected to the pixel electrode PE. The drain D of the active device T is electrically connected to the pixel electrode PE directly or through a contact window. The pixel electrode PE is a transmissive pixel electrode, a reflective pixel electrode, or a transflective pixel electrode.

The capacitor electrode line CL is located underneath the pixel electrode PE. The capacitor electrode line CL and the pixel electrode PE constitute a first storage capacitor MII having a first storage capacitance (Cst1). That is, the capacitor electrode line CL is adopted as a bottom electrode of the first storage capacitor MII and the pixel electrode PE is adopted as a top electrode of the first storage capacitor MII. A first dielectric layer 102 and a second dielectric layer 104 are disposed between the capacitor electrode line CL and the pixel electrode PE as a capacitor dielectric layer. In the present embodiment, an extension direction of the capacitor electrode line CL is parallel to the extension direction of the scan line SL. The capacitor electrode line CL is generally fabricated with a conductive material or a semi-conductive material for conductivity. The conductive material is, for example, a metal material such as aluminum, copper, silver, gold, titanium, molybdenum, tungsten, and so on. The semi-conductive material is, for instance, poly-silicon, doped poly-silicon, or indium gallium zinc oxide, and so on. However, the invention is not limited thereto. According to other embodiments, the capacitor electrode line CL can also be fabricated using other conductive material such as an alloy, a nitride of a metal material, an oxide of a metal material, an oxynitride of a metal material or other suitable material, or a stacked layer of a metal material and other conductive material or semi-conductive material.

The semi-conductive pattern layer 120 is disposed between the capacitor electrode line CL and the pixel electrode PE. The pixel electrode PE is electrically connected to the semi-conductive pattern layer 120. The semi-conductive pattern layer 120 and the capacitor electrode line CL constitute a second storage capacitor MIS having a second storage capacitance (Cst2). That is, the capacitor electrode line CL is adopted as a bottom electrode of the second storage capacitor MIS and the semi-conductive pattern layer 120 is adopted as a top electrode of the second storage capacitor MIS. The first dielectric layer 102 is disposed between the capacitor electrode line CL and the semi-conductive pattern layer 120 as a capacitor dielectric layer. According to the present embodiment, the semi-conductive pattern layer 120 includes a bottom semi-conductive material layer 106 and a top ohmic contact material layer 108. The top ohmic contact material layer 108 is a doped semi-conductive material layer, for instance.

The dielectric layer 110 is disposed between the capacitor electrode line CL and the pixel electrode PE and located between the semi-conductive pattern layer 120 and the capacitor electrode line CL. In details, the dielectric layer 110 includes the first dielectric layer 102 and the second dielectric layer 104. The first dielectric layer 102 is sandwiched between the semi-conductive pattern layer 120 and the capacitor electrode line CL. Thus, the first dielectric layer 102 disposed between the semi-conductive pattern layer 120 and the capacitor electrode line CL is adopted as a capacitor dielectric layer of the second storage capacitor MIS. The second dielectric layer 104 covers the first dielectric layer 102 and the semi-conductive pattern layer 120. Thus, the first dielectric layer 102 and the second dielectric layer 104 are sandwiched between the pixel electrode PE and the capacitor electrode line CL. In other words, the first dielectric layer 102 and the second dielectric layer 104 sandwiched between the pixel electrode PE and the capacitor electrode line CL are adopted as a capacitor dielectric layer of the first storage capacitor MII. Moreover, in the present embodiment, the second dielectric layer 108 has a contact window C, so that the pixel electrode PE is electrically connected to the semi-conductive pattern layer 120.

In particular, the second storage capacitance (Cst2) with a preferable ratio is provided in the invention. In the present embodiment, a total storage capacitance (Cst-total) is the sum of the first storage capacitance (Cst1) of the first storage capacitor MII and the second storage capacitance (Cst2) of the second storage capacitor MIS. Further, the second storage capacitance (Cst2) occupies 30%-80% of the total storage capacitance (Cst-total).

Generally, the capacitance of the capacitor is related to areas of top and bottom electrodes, voltages of the top and bottom electrodes, a dielectric constant of the capacitor dielectric layer, and the thickness of the capacitor dielectric layer. Therefore, in the invention, the areas and the voltages of the top and bottom electrodes can be adjusted, the capacitor dielectric layer with a specific dielectric constant can be selected, and the thickness of the capacitor dielectric layer can be adjusted, so that the second storage capacitance (Cst2) occupies 30%-80% of the total storage capacitance (Cst-total). In details, in one embodiment, an area overlapped by a bottom electrode (the capacitor electrode line CL) and a top electrode (the pixel electrode PE) of the first storage capacitor MII and an area overlapped by a bottom electrode (the capacitor electrode line CL) and a top electrode (the semi-conductive pattern layer 120) of the second storage capacitor MIS are adjusted, so that the second storage capacitance (Cst2) occupies 30%-80% of the total storage capacitance (Cst-total). According to another embodiment, a dielectric material with a suitable dielectric constant is selected to fabricate the capacitor dielectric layer (the dielectric layers 102, 104) of the first storage capacitor MII and the capacitor dielectric layer (the dielectric layer 102) of the second storage capacitor MIS, such that the second storage capacitance (Cst2) occupies 30%-80% of the total storage capacitance (Cst-total). In another embodiment, the thickness of the capacitor dielectric layer (the dielectric layers 102, 104) of the first storage capacitor MII and the thickness of the capacitor dielectric layer (the dielectric layer 102) of the second storage capacitor MIS are adjusted, such that the second storage capacitance (Cst2) occupies 30%-80% of the total storage capacitance (Cst-total).

Accordingly, the storage capacitor of the pixel structure of the invention has the second storage capacitor MIS and the second storage capacitance (Cst2) of the second storage capacitor MIS occupies 30%-80% of the total storage capacitance (Cst-total). Along with changes in the operation voltage and operation frequency of the capacitor, the semi-conductive pattern layer 120 in the second storage capacitor MIS shows different capacitances in an accumulation region, a depletion region, and an inversion region. When the semi-conductive pattern layer 120 is in the accumulation region, the second storage capacitor MIS has the largest capacitance. When the semi-conductive pattern layer 120 is in the depletion region, the depletion region is expanded and reduced according to the change in the voltage, so that the capacitance of the second storage capacitor MIS changes. When the semi-conductive pattern layer 120 is in the inversion region, the second storage capacitor MIS has the smallest capacitance. Thus, with characteristics of changing with the changes in the operation frequency and operation voltage, the storage capacitance of the second storage capacitor MIS can compensate the brightness difference caused by the image sticking phenomenon of the flat display so as to reduce surface type image sticking.

Figure 2A:
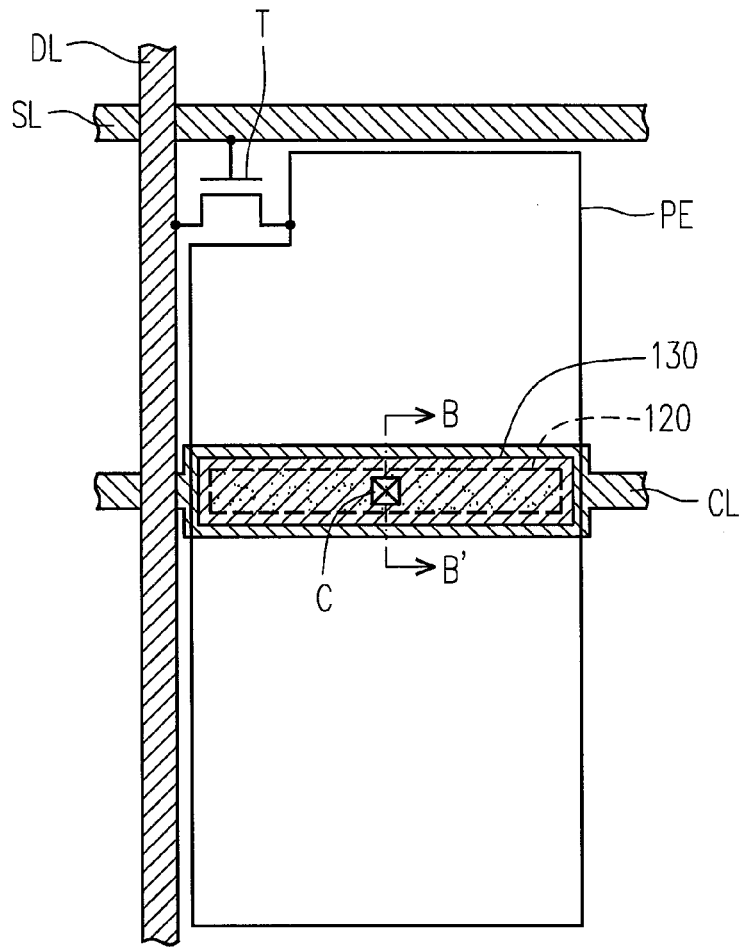
FIG. 2A illustrates a schematic top view of a pixel structure according to an embodiment of the invention.
Figure 2B:
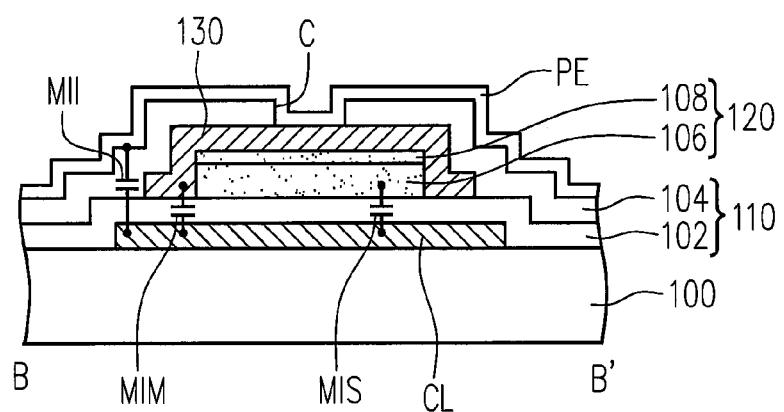
FIG. 2B shows a schematic cross-sectional view taken along line B-B' in FIG. 2A.

FIG. 2A illustrates a schematic top view of a pixel structure according to an embodiment of the invention. FIG. 2B shows a schematic cross-sectional view taken along line B-B' in FIG. 2A. Embodiments illustrated in FIGS. 2A and 2B are similar to the embodiments shown in FIGS. 1A and 1B; thus, elements identical as those in the embodiments of FIGS. 1A and 1B are denoted with the same notations and further details are omitted hereinafter. The embodiments illustrated in FIGS. 2A and 2B are different from the embodiments shown in FIGS. 1A and 1B in that the pixel structure in FIGS. 2A and 2B further includes a storage electrode pattern layer 130 disposed between the pixel electrode PE and the capacitor electrode line CL. The storage electrode pattern layer 130 is electrically connected to the pixel electrode PE. In details, in this embodiment, the storage electrode pattern layer 130 covers the semi-conductive pattern layer 120. In addition, the storage electrode pattern layer 130 is electrically connected to the pixel electrode PE through the contact window C formed in the second dielectric layer 104.

In particular, in the present embodiment, other than the first storage capacitor MII and the second storage capacitor MIS, the storage electrode pattern layer 130 and the capacitor electrode line CL further constitute a third storage capacitor MIM having a third storage capacitance (Cst3). That is, the capacitor electrode line CL is adopted as a bottom electrode of the third storage capacitor MIM, the storage electrode pattern layer 130 is adopted as a top electrode of the third storage capacitor MIM, and the first dielectric layer 102 sandwiched between the storage electrode pattern layer 130 and the capacitor electrode line CL is adopted as a capacitor dielectric layer of the third storage capacitor MIM.

Therefore, the total storage capacitance (Cst-total) of the pixel structure in the present embodiment is the sum of the first storage capacitance (Cst1) of the first storage capacitor MIL the second storage capacitance (Cst2) of the second storage capacitor MIS, and the third storage capacitance (Cst3) of the third storage capacitor MIM. Moreover, the second storage capacitance (Cst2) occupies 30%-80% of the total storage capacitance (Cst-total).

Similarly, in the present embodiment, areas overlapped by the bottom electrodes and the top electrodes, voltages of the top and the bottom electrodes, dielectric constants of the capacitor dielectric layers, and thicknesses of the capacitor dielectric layers of the first storage capacitor MIL the second storage capacitor MIS, and the third storage capacitor MIM can be adjusted, so that the second storage capacitance (Cst2) of the second storage capacitor MIS occupies 30%-80% of the total storage capacitance (Cst-total).

For example, as depicted in FIGS. 2A and 2B, the area of the semi-conductive pattern layer 120 is designed to be smaller than the area of the storage electrode pattern layer 130. Thus, other than covering an upper surface of the semi-conductive pattern layer 120, the storage electrode pattern layer 130 also covers a side surface of the semi-conductive pattern layer 120. In other words, in the present embodiment, the area of the electrodes in the storage capacitor is specifically designed so that the second storage capacitance (Cst2) of the second storage capacitor MIS occupies 30%-80% of the total storage capacitance (Cst-total).

Figure 3A:
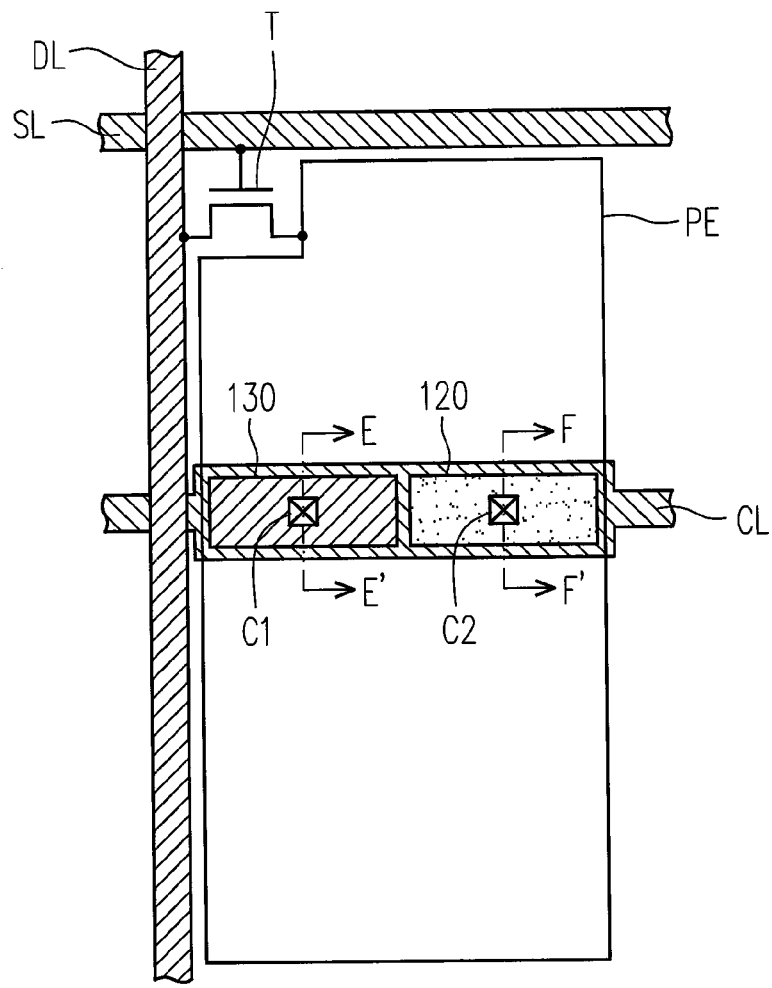
FIG. 3A illustrates a schematic top view of a pixel structure according to an embodiment of the invention.
Figure 3B:
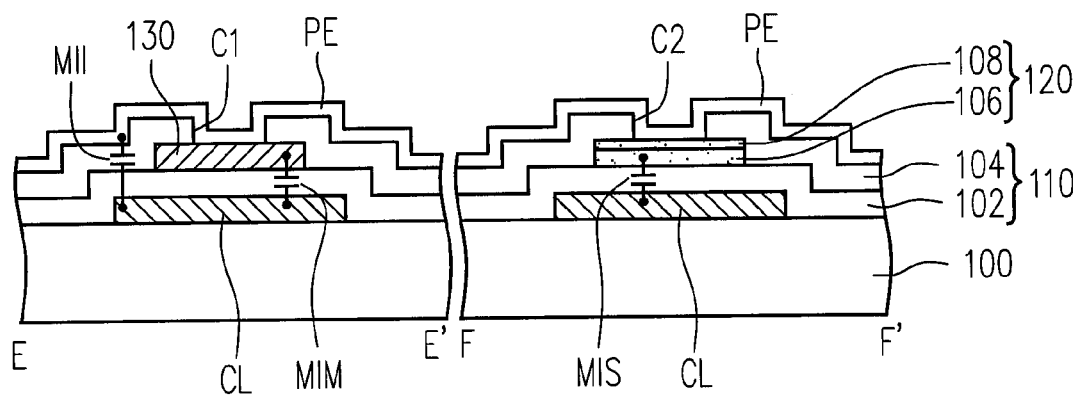
FIG. 3B illustrates a schematic cross-sectional view taken along line E-E' and line F-F' in FIG. 3A.

FIG. 3A illustrates a schematic top view of a pixel structure according to an embodiment of the invention. FIG. 3B illustrates a schematic cross-sectional view taken along line E-E' and line F-F in FIG. 3A. Embodiments illustrated in FIGS. 3A and 3B are similar to the embodiments shown in FIGS. 2A and 2B; thus, elements identical as those in the embodiments of FIGS. 2A and 2B are denoted with the same notations and further details are omitted hereinafter. The embodiments in FIGS. 3A and 3B are different from those in FIGS. 2A and 2B in that the storage electrode pattern layer 130 and the semi-conductive pattern layer 120 are not overlapped in FIGS. 3A and 3B, and the storage electrode pattern layer 130 and the semi-conductive pattern layer 120 are electrically connected to the pixel electrode PE respectively. Furthermore, the second dielectric layer 104 has a first contact window C1 and a second contact window C2. The first contact window C1 is electrically connected to the storage electrode pattern layer 130 and the pixel electrode PE. The second contact window C2 is electrically connected to the semi-conductive pattern layer 120 and the pixel electrode PE.

Similarly, in the present embodiment, areas overlapped by the bottom electrodes and the top electrodes, voltages of the top and the bottom electrodes, dielectric constants of the capacitor dielectric layers, and thicknesses of the capacitor dielectric layers of the first storage capacitor MII, the second storage capacitor MIS, and the third storage capacitor MIM are adjusted, so that the second storage capacitance (Cst2) of the second storage capacitor MIS occupies 30%-80% of the total storage capacitance (Cst-total).

Figure 4A:
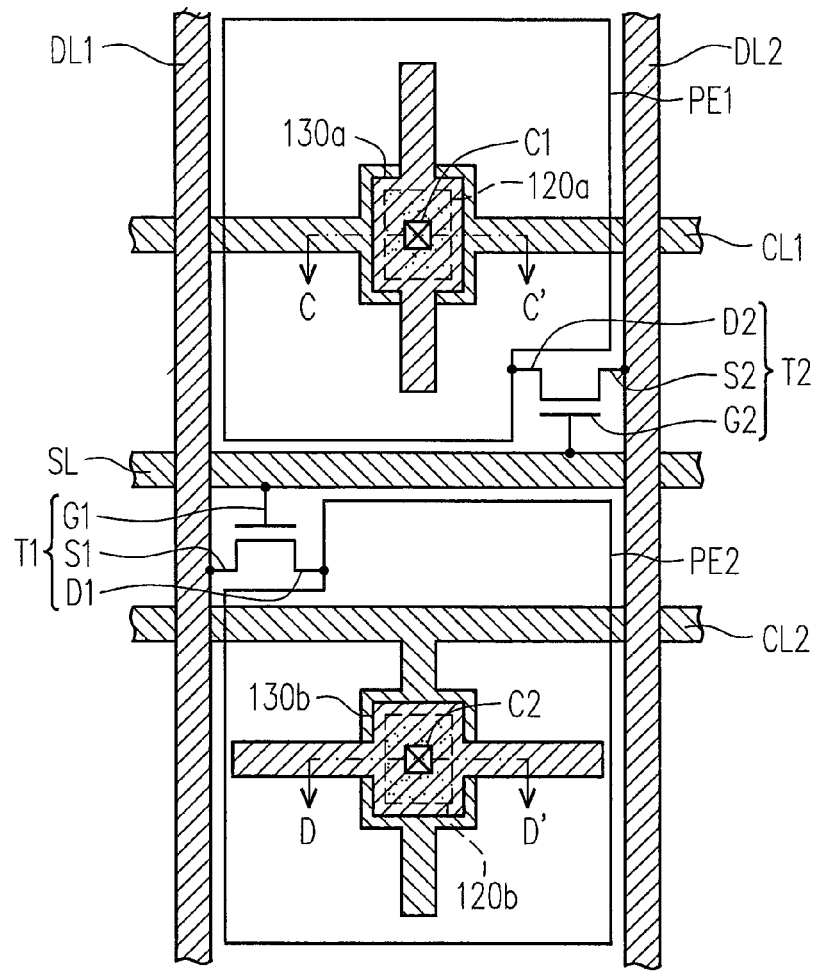
FIG. 4A illustrates a schematic top view of a pixel structure according to an embodiment of the invention.
Figure 4B:
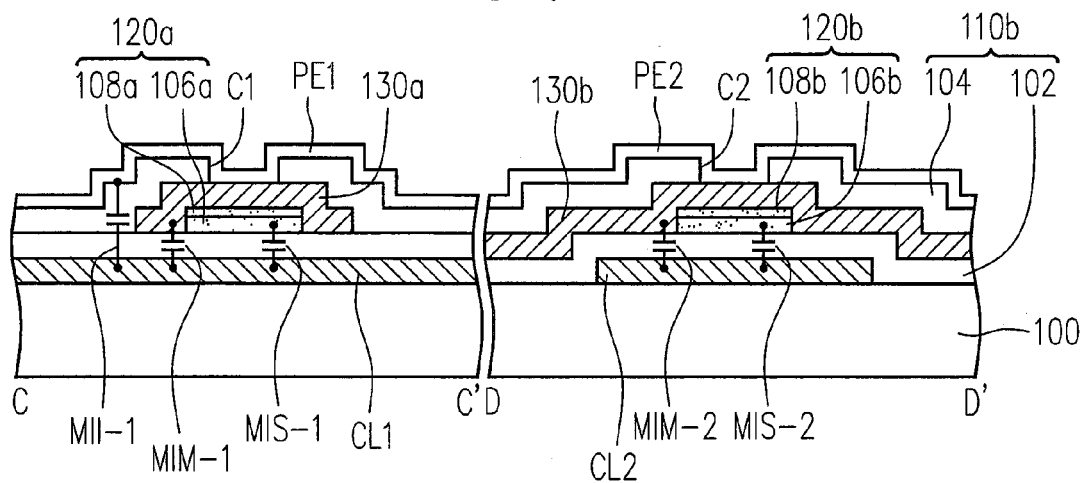
FIG. 4B illustrates a schematic cross-sectional view taken along line C-C' and line D-D' in FIG. 4A.

FIG. 4A illustrates a schematic top view of a pixel structure according to an embodiment of the invention. FIG. 4B illustrates a schematic cross-sectional view taken along line C-C' and line D-D' in FIG. 4A. Referring to FIGS. 4A and 4B, a pixel structure of the present embodiment includes a scan line SL, a plurality of data lines DL1, DL2, a plurality of active devices T1, T2, a plurality of pixel electrodes PE1, PE2, a plurality of capacitor electrode lines CL1, CL2, a plurality of semi-conductive pattern layers 120a, 120b, a plurality of storage electrode pattern layers 130a, 130b, and a dielectric layer 110.

The active device T1 has a gate G1, a source S1, and a drain D1. The gate G1 is electrically connected to the scan line SL and the source S1 is electrically connected to the data line DL1. The active device T2 has a gate G2, a source S2, and a drain D2. The gate G2 is electrically connected to the scan line SL and the source S2 is electrically connected to the data line DL2. The active devices T1, T2 are bottom gate TFTs or top gate TFTs.

The drain D1 of the active device T1 is electrically connected to the pixel electrode PE1 and the drain D2 of the active device T2 is electrically connected to the pixel electrode PE2. The pixel electrodes PE1, PE2 are transmissive pixel electrodes, reflective pixel electrodes, or transflective pixel electrodes respectively.

The capacitor electrode line CL1 is located underneath the pixel electrode PE1. The capacitor electrode line CL2 is located underneath the pixel electrode PE2. The capacitor electrode line CL1 and the pixel electrode PE1 constitute a first storage capacitor MII-1 having a first storage capacitance (Cst1-1). The capacitor electrode line CL2 and the pixel electrode PE2 constitute a first storage capacitor MII-2 (not shown) having a first storage capacitance (Cst1-2).

The semi-conductive pattern layer 120a is sandwiched between the capacitor electrode line CL1 and the pixel electrode PE1. The semi-conductive pattern layer 120a and the capacitor electrode line CL1 constitute a second storage capacitor MIS-1 having a second storage capacitance (Cst2-1). According to the present embodiment, the semi-conductive pattern layer 120a includes a bottom semi-conductive material layer 106a and a top ohmic contact material layer 108a. Similarly, the semi-conductive pattern layer 120b is sandwiched between the capacitor electrode line CL2 and the pixel electrode PE2. The semi-conductive pattern layer 120b and the capacitor electrode line CL2 constitute a second storage capacitor MIS-2 having a second storage capacitance (Cst2-2). According to the present embodiment, the semi-conductive pattern layer 120b includes a bottom semi-conductive material layer 106b and a top ohmic contact material layer 108b.

The storage electrode pattern layer 130a is sandwiched between the pixel electrode PE1 and the capacitor electrode line CL1, and the storage electrode pattern layer 130a and the pixel electrode PE1 are electrically connected. Additionally, the storage electrode pattern layer 130a and the capacitor electrode line CL1 constitute a third storage capacitor MIM-1 having a third storage capacitance (Cst3-1). Similarly, the storage electrode pattern layer 130b is sandwiched between the pixel electrode PE2 and the capacitor electrode line CL2, and the storage electrode pattern layer 130b and the pixel electrode PE2 are electrically connected. Further, the storage electrode pattern layer 130b and the capacitor electrode line CL2 constitute a third storage capacitor MIM-2 having a third storage capacitance (Cst3-2).

The dielectric layer 110 includes a first dielectric layer 102 and a second dielectric layer 104. The first dielectric layer 102 is sandwiched between the semi-conductive pattern layer 120a and the capacitor electrode line CL1 and between the semi-conductive pattern layer 120b and the capacitor electrode line CL2. Here, the first dielectric layer 102 is adopted as capacitor dielectric layers of the second storage capacitors MIS-1, MIS-2. The second dielectric layer 104 covers the first dielectric layer 102 and the semi-conductive pattern layers 120a, 120b. Thus, the first dielectric layer 102 and the second dielectric layer 104 are sandwiched between the pixel electrode PE1 and the capacitor electrode line CL1 and between the pixel electrode PE2 and the capacitor electrode line CL2. Therefore, the first dielectric layer 102 and the second dielectric layer 104 are adopted as capacitor dielectric layers of the first storage capacitors MII-1, MII-2. The first dielectric layer 102 is further sandwiched between the storage electrode pattern layer 130a and the capacitor electrode line CL1 and between the storage capacitor pattern layer 130b and the capacitor electrode line CL2. Here, the first dielectric layer 102 is adopted as capacitor dielectric layers of the third storage capacitors MIM-1, MIM-2. Also, in the present embodiment, the second dielectric layer 108 has contact windows C1, C2, so that the pixel electrode PE1 and the storage electrode pattern layer 130a are electrically connected and the pixel electrode PE2 and the storage electrode pattern layer 130b are electrically connected.

In particular, a sum of the first storage capacitances (Cst1-1, Cst1-2) of the first storage capacitors MII-1, MII-1, the second storage capacitances (Cst2-1, Cst2-2) of the second storage capacitors MIS-1, MIS-2, and the third storage capacitances (Cst3-1, Cst3-2) of the third storage capacitors MIM-1, MIM-2 is a total storage capacitance (Cst-total). Moreover, the second storage capacitances (Cst2-1, Cst2-2) occupy 30%-80% of the total storage capacitance (Cst-total). Similarly, in the present embodiment, areas overlapped by the bottom electrodes and the top electrodes, voltages of the top and the bottom electrodes, dielectric constants of the capacitor dielectric layers, and thicknesses of the capacitor dielectric layers of the first storage capacitors MII-1, MII-2, the second storage capacitor MIS-1, MIS-2, and the third storage capacitor MIM-1, MIM-2 are adjusted, so that the second storage capacitances (Cst2-1, Cst2-2) of the second storage capacitors MIS-1, MIS-2 occupy 30%-80% of the total storage capacitance (Cst-total).

Figure 5A:
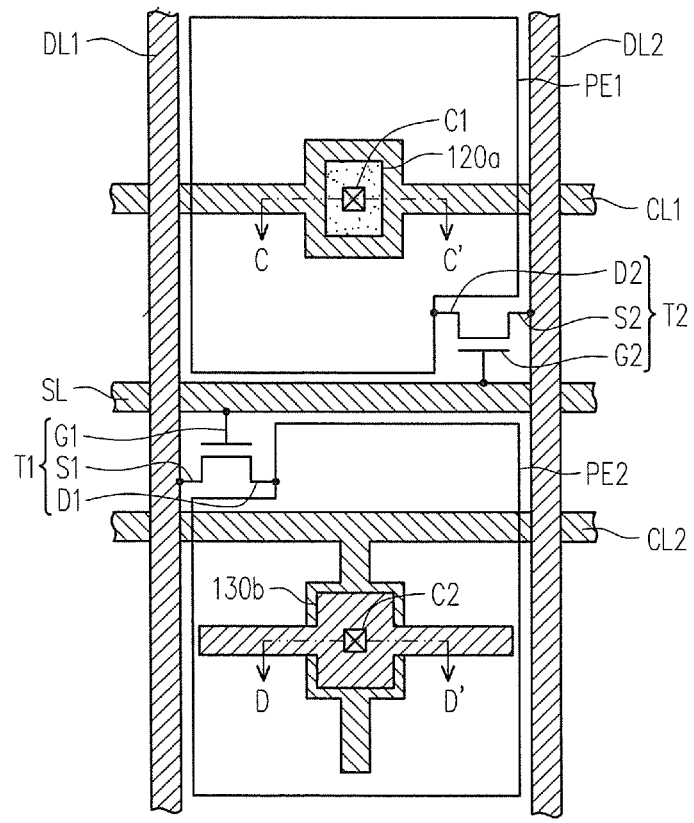
FIG. 5A shows a schematic top view of a pixel structure according to an embodiment of the invention.
Figure 5B:
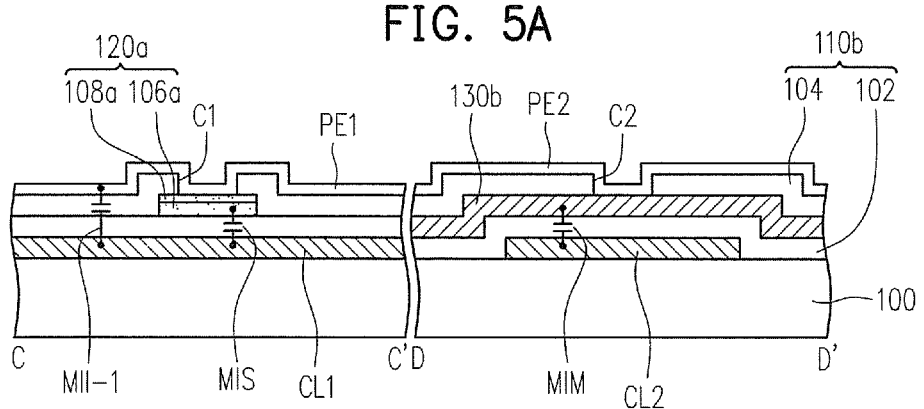
FIG. 5B illustrates a schematic cross-sectional view taken along line C-C' and line D-D' in FIG. 5A.

FIG. 5A shows a schematic top view of a pixel structure according to an embodiment of the invention. FIG. 5B illustrates a schematic cross-sectional view taken along line C-C' and line D-D' in FIG. 5A. Embodiments illustrated in FIGS. 5A and 5B are similar to the embodiments shown in FIGS. 4A and 4B; thus, elements identical as those in the embodiments of FIGS. 4A and 4B are denoted with the same notations and further details are omitted hereinafter. The embodiments in FIGS. 5A and 5B are different from those depicted in FIGS. 4A and 4B in that the storage electrode pattern layer is not disposed above the capacitor electrode line CL1 and only the semi-conductive pattern layer 120*a* is disposed above the capacitor electrode line CL1. Moreover, the pixel electrode PE1 and the semi-conductive pattern layer 120 are electrically connected through the contact window C1. Further, the semi-conductive pattern layer is not disposed above the capacitor electrode line CL2 and only the storage electrode pattern layer 130*b* is disposed above the capacitor electrode line CL2. Also, the pixel electrode PE2 and the storage electrode pattern layer are electrically connected through the contact window C2.

Therefore, in the present embodiment, the capacitor electrode line CL1 and the pixel electrode PE1 constitute the first storage capacitor MII-1 having the first storage capacitance (Cst1-1). The capacitor electrode line CL2 and the pixel electrode PE2 constitute the first storage capacitor MII-2 (not shown) having the first storage capacitance (Cst1-2). The semi-conductive pattern layer 120 and the capacitor electrode line CL1 constitute the second storage capacitor MIS having the second storage capacitance (Cst2). The storage electrode pattern layer 130*b* and the capacitor electrode line CL2 constitute the third storage capacitor MIM having a third storage capacitance (Cst3).

Specifically, a sum of the first storage capacitances (Cst1-1, Cst1-2) of the first storage capacitors MII-1, MII-1, the second storage capacitance (Cst2) of the second storage capacitor MIS, and the third storage capacitance (Cst3) of the third storage capacitor MIM is a total storage capacitance (Cst-total). Moreover, the second storage capacitance (Cst2) occupies 30%-80% of the total storage capacitance (Cst-total).

Figure 6A:
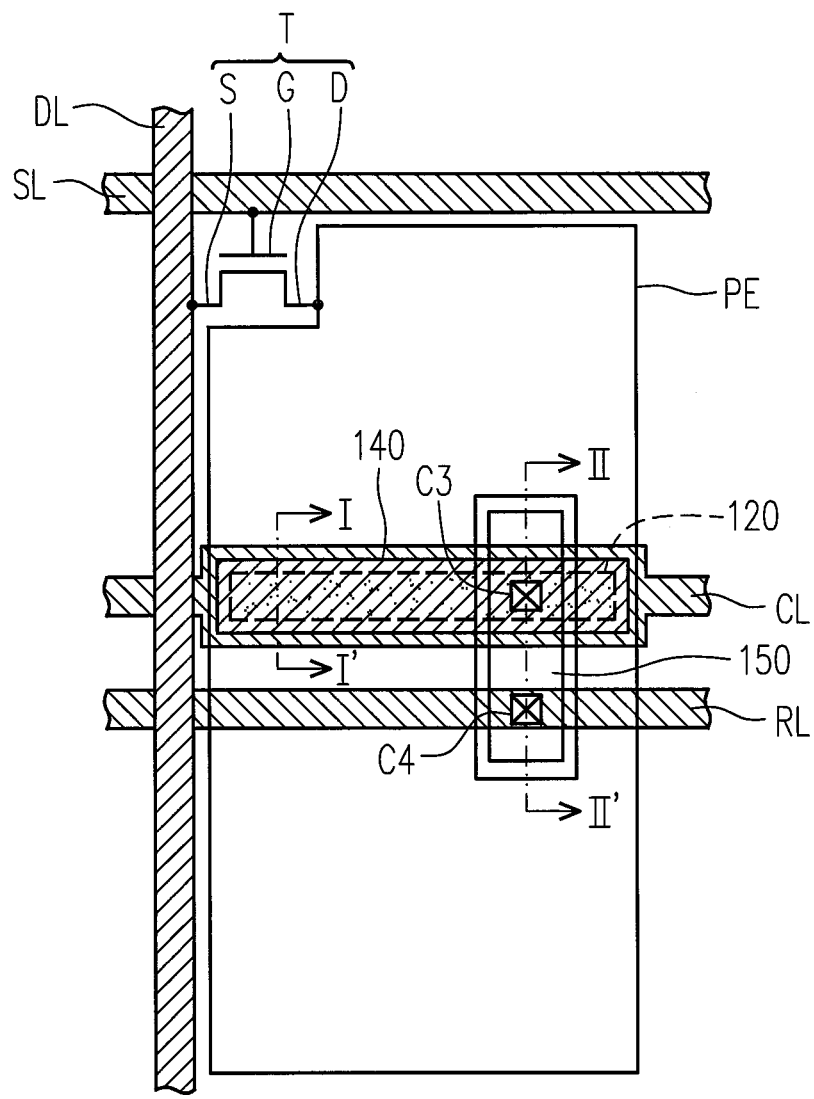
FIG. 6A illustrates a schematic top view of a pixel structure according to an embodiment of the invention.
Figure 6B:
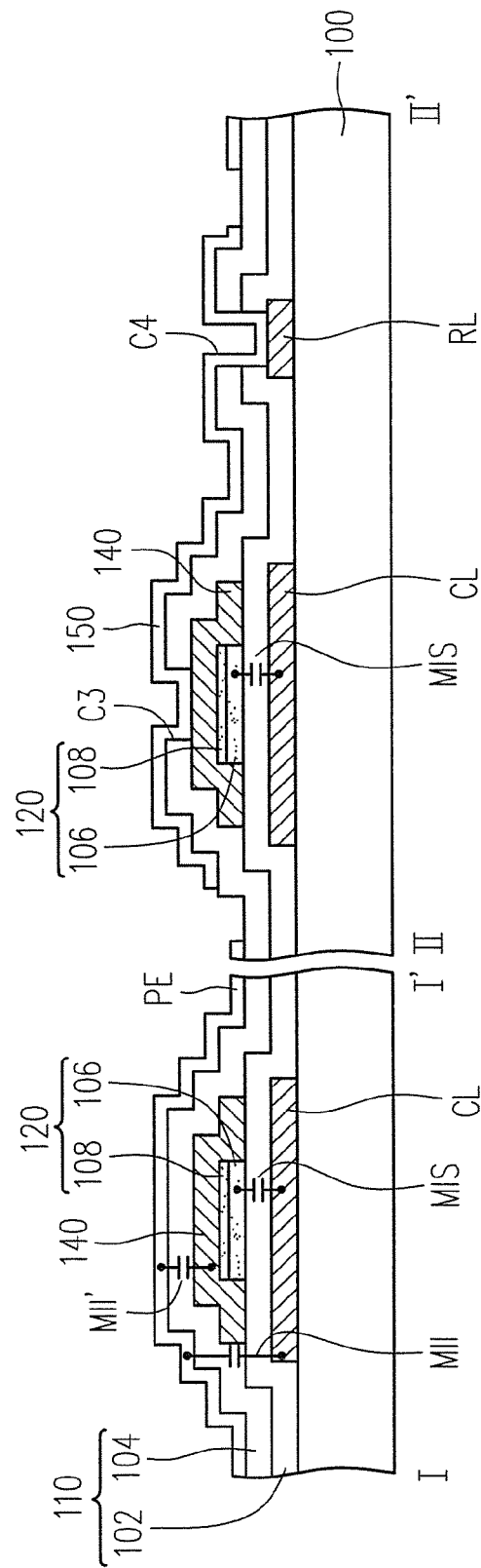
FIG. 6B illustrates a schematic cross-sectional view taken along line I-I' and line II-II' in FIG. 6A.

FIG. 6A illustrates a schematic top view of a pixel structure according to an embodiment of the invention. FIG. 6B illustrates a schematic cross-sectional view taken along line I-I' and line II-II' in FIG. 6A. Embodiments illustrated in FIGS. 6A and 6B are similar to the embodiments shown in FIGS. 1A and 1B; thus, elements same as those in the embodiments of FIGS. 1A and 1B are denoted with the same notations and further details are omitted hereinafter. The embodiments in FIGS. 6A and 6B are different from those in FIGS. 1A and 1B in that the pixel structure further includes a reference electrode pattern layer 140 and a reference electrode line RL.

The reference electrode pattern layer 140 is sandwiched between the pixel electrode PE and the semi-conductive pattern layer 120. The reference electrode pattern layer 140 is electrically insulated with the pixel electrode PE. In addition, the reference electrode pattern layer 140 and the pixel electrode PE constitute a third storage capacitor MII' having a third storage capacitance (Cst3). In the present embodiment, the reference electrode pattern layer 140 covers the semi-conductive pattern layer 120.

The reference electrode line RL is electrically connected to the reference electrode pattern layer 140. In the present embodiment, the reference electrode line RL and the capacitor electrode line CL are disposed in the same layer. However, the invention is not limited thereto.

In the present embodiment, the first dielectric layer 102 is sandwiched between the semi-conductive pattern layer 120 and the capacitor electrode line CL. The second dielectric layer 104 covers the first dielectric layer 102 and the reference electrode pattern layer 140. Thus, the first dielectric layer 102 and the second dielectric layer 104 are sandwiched between the pixel electrode PE and the capacitor electrode line CL. The second dielectric layer 104 is sandwiched between the pixel electrode PE and the reference electrode pattern layer 140. In the present embodiment, the reference electrode pattern layer 140 and the reference electrode line RL are electrically connected through a contact window C3 formed in the second dielectric layer 104, a contact window C4 formed in the first dielectric layer 102 and the second dielectric layer 104, and a connecting layer 150 disposed on the second dielectric layer 102. In details, the contact window C3 is electrically connected to the reference electrode pattern layer 140 and the connecting layer 150, and the contact window C4 is electrically connected to the reference electrode line RL and the connecting layer 150, such that the reference electrode pattern layer 140 is electrically connected to the reference electrode line RL. The connecting layer 150 is electrically connected to the pixel electrode PE. Accordingly, the reference electrode pattern layer 140 is electrically connected to the pixel electrode PE. In the present embodiment, the connecting layer 150 and the pixel electrode PE are disposed in the same layer; however, a space is present therebetween for the connecting layer 150 and the pixel electrode PE to be electrically insulated.

As aforementioned, in the present embodiment, the capacitor electrode line CL and the pixel electrode PE constitute the first storage capacitor MII having the first storage capacitance (Cst1). The semi-conductive pattern layer 120 and the capacitor electrode line CL1 constitute the second storage capacitor MIS having the second storage capacitance (Cst2). The reference electrode pattern layer 140 and the pixel electrode PE constitute the third storage capacitor MII' having the third storage capacitance (Cst3). Since the reference electrode pattern layer 140 is electrically connected to the reference electrode line RL, the third storage capacitance (Cst3) of the third storage capacitor MII' and the second storage capacitance (Cst2) of the second storage capacitor MIS can be changed by adjusting the voltages of the reference electrode line RL.

Similarly, the total storage capacitance (Cst-total) of the pixel structure in the present embodiment is the sum of the first storage capacitance (Cst1) of the first storage capacitor MII, the second storage capacitance (Cst2) of the second storage capacitor MIS, and the third storage capacitance (Cst3) of the third storage capacitor MIL Here, the second storage capacitance (Cst2) occupies 30%-80% of the total storage capacitance (Cst-total).

In the present embodiment, the capacitance value of the third storage capacitance (Cst3) of the third storage capacitor MII' and the second storage capacitance (Cst2) of the second storage capacitor MIS can be controlled by adjusting the voltage of the reference electrode line RL. Also, areas of the top and bottom electrodes, dielectric constants of the capacitor dielectric layers, and thicknesses of the capacitor dielectric layers of the first storage capacitor MII, the second storage capacitor MIS, and the third storage capacitor MII' are adjusted, so that the second storage capacitance (Cst2) of the second storage capacitor MIS occupies 30%-80% of the total storage capacitance (Cst-total).

Figure 7:
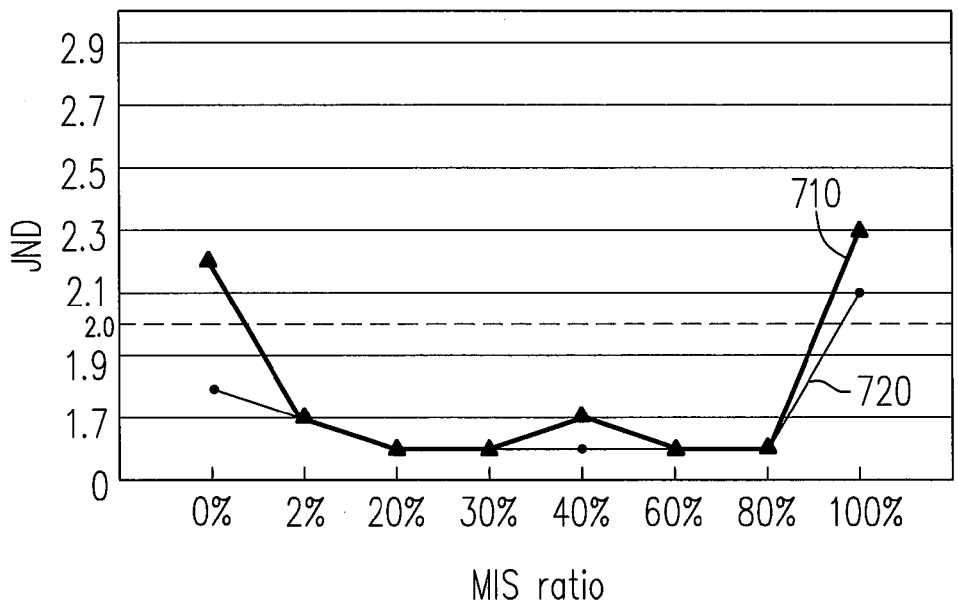
FIGS. 7 and 8 are diagrams showing a relationship between a ratio of a storage capacitance of a metal-insulator-semiconductor (MIS) storage capacitor occupying a total storage capacitance and just notice difference (JND).
Figure 8:
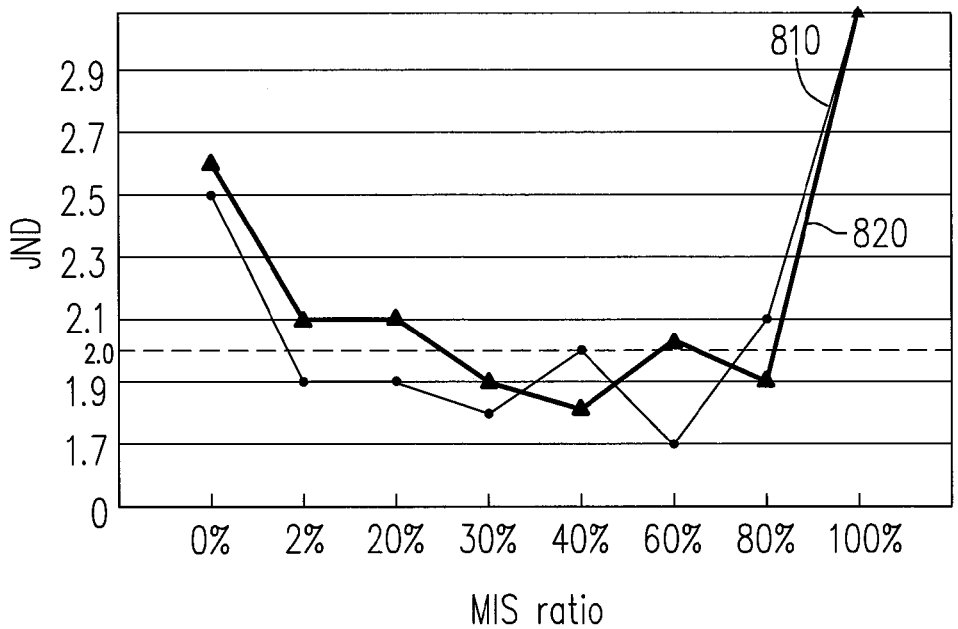

FIGS. 7 and 8 are diagrams showing a relationship between a ratio of a storage capacitance of a metal-insulator-semiconductor (MIS) storage capacitor occupying a total storage capacitance and a just notice difference (JND). In FIGS. 7 and 8, the horizontal axis represents the ratio of the storage capacitance of the MIS storage capacitor occupying the total storage capacitance while the vertical axis represents the JND value. Referring to FIG. 7, as the JND value becomes smaller, the voltage compensated by the capacitance becomes higher. The curve 710 shows a firing time of an image sticking test to be 504 hours and the curve 720 shows a firing time of an image sticking test to be 168 hours. As shown in FIG. 7, when the storage capacitance of the MIS storage capacitor occupies 20%-80% of the total storage capacitance, the JND value thereof is smaller. The image sticking test of FIG. 8 is performed under low grayscale (level 32) and the curve 810 shows a firing time of an image sticking test to be 504 hours and the curve 820 shows a firing time of an image sticking test to be 168 hours. As illustrated in FIG. 8, when the storage capacitance of the MIS storage capacitor occupies 30%-80% of the total storage capacitance, the JND value thereof is smaller. Thus, as depicted in FIGS. 7 and 8, when the storage capacitance of the MIS storage capacitor in the pixel structure occupies 30%-80% of the total storage capacitance, the JND value is more preferable. In other words, when the storage capacitance of the MIS storage capacitor occupies 30%-80% of the total storage capacitance, the capacitance of the MIS storage capacitor better compensates the image sticking phenomenon of the liquid crystal display. The invention is not limited to liquid crystal displays, but can also compensate other flat displays such as organic light emitting displays or electrophoretic displays.

Figure 9:
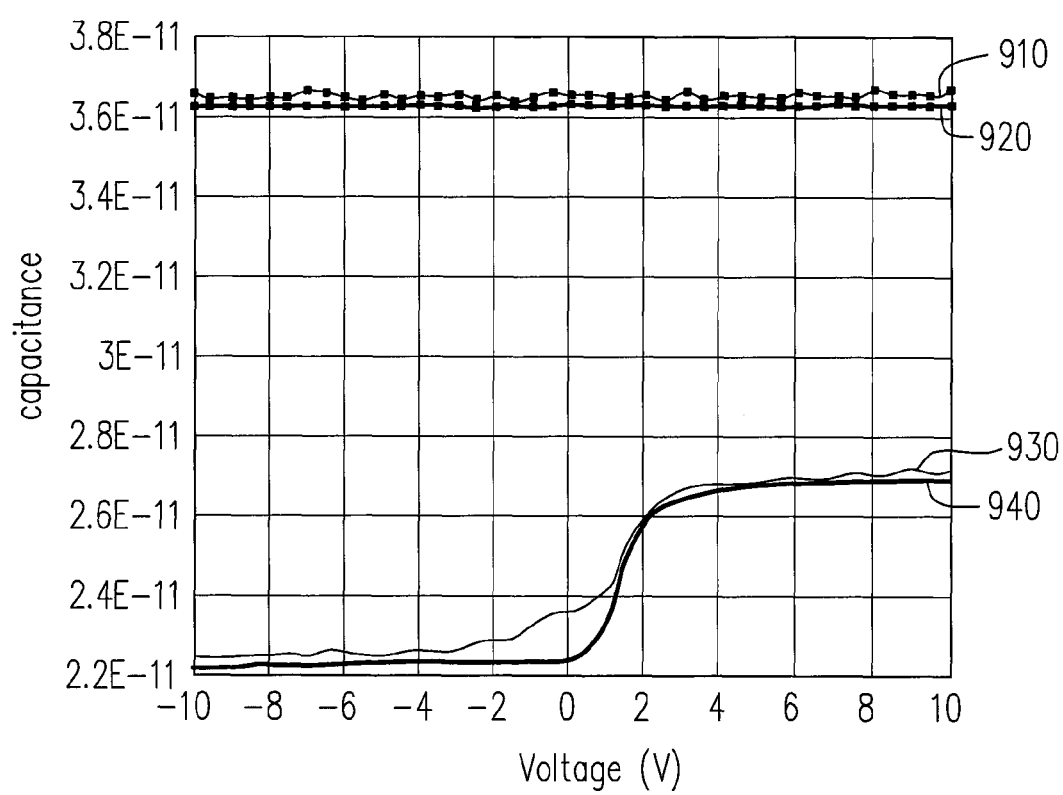
FIG. 9 illustrates a relationship between voltage and change of capacitance.

FIG. 9 illustrates a relationship between voltage and change of capacitance. In FIG. 9, a horizontal axis represents voltage (V) while a vertical axis represents capacitance. Further, the curve 910 shows a relationship between the voltage and the capacitance of a metal-insulator-metal (MIM) capacitor with an operation frequency of 100 Hz; the curve 920 shows a relationship between the voltage and the capacitance of the MIM capacitor with an operation frequency of 100 KHz; the curve 930 shows a relationship between the voltage and the capacitance of the MIS capacitor with an operation frequency of 100 Hz; and the curve 940 shows a relationship between the voltage and the capacitance of the MIS capacitor with an operation frequency of 100 KHz. As depicted in FIG. 9, whether the MIM capacitor is operated with a low frequency or a high frequency, the capacitance thereof does not vary with the change of the operation voltage. On the other hand, whether the MIS capacitor is operated with a low frequency or a high frequency, the capacitance thereof varies with the change of the operation voltage.

Referring to FIG. 9, a semi-conductive material is adopted for fabricating the electrodes of the MIS capacitor and as the semi-conductive material includes the accumulation region, the depletion region, and the inversion region due to the different operation voltages and operation frequencies, the capacitor can provide different capacitances in the accumulation region, the depletion region, and the inversion region of the semi-conductive material. Conversely, in the MIM capacitor, the top and the bottom electrodes of the capacitor are both fabricated with metal instead of the semi-conductive material. Consequently, the capacitance of the MIM capacitor does not provide different capacitances due to different operation voltages and operation frequencies.

In summary, in the invention, the semi-conductive pattern layer is disposed in the pixel structure, so that the semi-conductive pattern layer and the capacitor electrode line constitute the storage capacitor. The semi-conductive material changes the storage capacitance of the storage capacitor under different operation frequencies and operation voltages. Thus, in the pixel structure, the storage capacitance of the storage capacitor having the semi-conductive pattern layer occupies a certain ratio of the total storage capacitance so as to compensate the brightness difference caused by the image sticking phenomenon of the flat display (especially the flat display with the normally black driving method), thereby reducing the surface type image sticking of the flat display.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A pixel structure, comprising:
   a scan line and a data line;
   an active device, electrically connected to the scan line and the data line;
   a pixel electrode, electrically connected to the active device;
   a capacitor electrode line, located underneath the pixel electrode, wherein the capacitor electrode line and the pixel electrode constitute a first storage capacitor having a first storage capacitance;
   a semi-conductive pattern layer, disposed between the capacitor electrode line and the pixel electrode, wherein the pixel electrode is electrically connected to the semi-conductive pattern layer, and the semi-conductive pattern layer and the capacitor electrode line constitute a second storage capacitor having a second storage capacitance;
   a reference electrode pattern layer, disposed between the pixel electrode and the semi-conductive pattern layer, wherein the reference electrode pattern layer is electrically insulated with the pixel electrode and constitutes a third storage capacitor having a third storage capacitance with the pixel electrode;
   at least one dielectric layer, disposed between the capacitor electrode line and the pixel electrode, disposed between the semi-conductive pattern layer and the capacitor electrode line, and disposed between the reference electrode pattern layer and the pixel electrode, wherein the at least one dielectric layer comprises:
      a first dielectric layer, disposed between the semi-conductive pattern layer and the capacitor electrode line; and
      a second dielectric layer, covering the first dielectric layer and the reference electrode pattern layer, wherein the first dielectric layer and the second dielectric layer are sandwiched between the pixel electrode and the capacitor electrode line, and the second dielectric layer is sandwiched between the pixel electrode and the reference electrode pattern layer;
   a reference electrode line, electrically connected to the reference electrode pattern layer,
   a first contact window, disposed in the second dielectric layer;
   a second contact window, disposed in the first dielectric layer and the second dielectric layer; and
   a connecting layer, electrically connected to the reference electrode pattern layer and the reference electrode line respectively through the first contact window and the second contact window, such that the reference electrode pattern layer and the reference electrode line are electrically connected,
   wherein a total storage capacitance is the sum of the first storage capacitance, the second storage capacitance and the third storage capacitance, and the second storage capacitance occupies 30%-80% of the total storage capacitance.

2. The pixel structure as claimed in claim 1, wherein the reference electrode line and the capacitor electrode line are disposed in a same layer.

3. The pixel structure as claimed in claim 1, wherein the reference electrode pattern layer covers the semi-conductive pattern layer.

* * * * *